United States Patent
Lemke (10) Patent No.: US 7,512,806 B2
(45) Date of Patent: Mar. 31, 2009

(54) SECURITY TECHNIQUE FOR CONTROLLING ACCESS TO A NETWORK BY A WIRELESS DEVICE

(75) Inventor: Steve Lemke, Sunnyvale, CA (US)

(73) Assignee: PalmSource, Inc., Sunnyvale, CA (US)

( * ) Notice: Subject to any disclaimer, the term of this patent is extended or adjusted under 35 U.S.C. 154(b) by 871 days.

(21) Appl. No.: 09/727,984

(22) Filed: Nov. 30, 2000

(65) Prior Publication Data
US 2002/0066041 A1 May 30, 2002

(51) Int. Cl.
G06F 7/04 (2006.01)
(52) U.S. Cl. .................... 713/186; 713/182; 726/2; 726/3; 726/4; 726/21
(58) Field of Classification Search ........... 713/201, 713/200, 182, 185–186; 726/1–6, 27–29
See application file for complete search history.

(56) References Cited

U.S. PATENT DOCUMENTS 5,712,912 A * 1/1998 Tomko et al. ............... 713/186
5,963,908 A * 10/1999 Chadha ...................... 704/273
6,016,476 A * 1/2000 Maes et al. .................. 705/1
6,087,956 A * 7/2000 Helferich ................... 340/7.3
6,189,099 B1 * 2/2001 Rallis et al. ................ 713/172
6,442,286 B1 * 8/2002 Kramer ...................... 382/124
6,496,928 B1 * 12/2002 Deo et al. ................... 713/153

FOREIGN PATENT DOCUMENTS

WO          WO9812670        *  3/1998

* cited by examiner

Primary Examiner—Kim Vu
Assistant Examiner—Ponnoreay Pich
(74) Attorney, Agent, or Firm—Berry & Associates P.C.

(57) ABSTRACT

The present invention relates to a method for protecting the security of a computer network which is accessed through the use of wireless devices, among other means. Specifically, the present invention pertains to a method of using user-specific biometric data to identify users of wireless devices such as PDAs and yet prevent use by unauthorized persons and prevent changing of the biometric data by unauthorized persons. The method also prevents unauthorized access, and facilitates authorized access, to computer networks. Control of access to the biometric data and control of access to the network can be maintained in the network administrator or other responsible body and thereby also offers security against theft.

21 Claims, 8 Drawing Sheets

SECURITY TECHNIQUE FOR CONTROLLING ACCESS TO A NETWORK BY A WIRELESS DEVICE

FIELD OF THE INVENTION

The present invention relates to a method for improving the security of a computer network by controlling access by a wireless device.

BACKGROUND OF THE INVENTION

As the components required to build a computer system have reduced in size, new categories of computer systems have emerged. One of the more recent categories of computer systems is the portable or "palmtop" computer system, or personal digital assistant (PDA). A palmtop computer system is a computer that is small enough to be held in the hand of a user and is thus "palm-sized." As a result, palmtops are readily carried about in a briefcase or purse, and some palmtops are compact enough to fit into a person's pocket. By virtue of their size, palmtop computer systems are also lightweight and so are exceptionally portable and convenient. Further development of PDAs has enabled their use for portable, and even wireless, access to computer networks. The portability and convenience makes such devices ideal for such wireless access to a local area network (LAN) in a dynamic workplace.

On the other hand, because they are relatively small, palmtop computer systems and other wireless devices can be easily lost, stolen or carried home by employees leaving the employ of a company. Although they are not extremely expensive, the loss of physical control of the device can mean the loss of control of access to the LAN and also to the data stored on the device itself. To the owner of the network and the device-resident data, access by unauthorized, and possibly unfriendly, persons could well mean disaster for the company. Consequently, it is extremely desirable to maintain control of access to the device, and thus the network, in the hands of the network manager.

One method for protecting against unauthorized use of a computer system or unauthorized access to information stored in it is to use a password. However, passwords are considered by many users to be vexing and inconvenient, passwords can lock out even an authorized user, and experience shows that passwords can be defeated by unauthorized users.

A more reliable means of determining the identity of a potential user of a network, and thus whether that person is an authorized user, is by the use of biometric data identification. Biometric data is data taken from the measurement of some characteristic peculiar to an individual. A digitized thumbprint is an example of biometric data. Iris scans, speech pattern scans or various body electrical characteristics are also biometric data.

In a system that uses biometric data for identification, a device that reads biometric data scans the relevant measurement of the candidate for identification. The attached system then compares the scanned data with data stored in the system. A match of data sets is then sufficient for identification.

A now-common implementation of such a scheme is the use of a thumbprint scanner which can read the user's thumbprint and determine whether it compares favorably with a stored thumbprint. If the user's data does not compare favorably, the system to which the identifying device is connected refuses to allow access to either on-board data or the network. An iris scanner or a speech pattern reader function similarly, though may be somewhat more difficult to implement. Biometric data readers are sometimes used, currently, on high-security systems but are typically part of mainframe or desktop systems.

More and more, local area networks (LAN)s, particularly in fast-paced "high-tech" industries, are accessed by wireless devices. If access to the network is by a wireless device protected by a biometric data reader, and the device were to be lost or stolen or the authorized user terminates employment, the biometric data and its applicable reader would remain with the wireless device unless there were a means for remotely reprogramming the data resident in the wireless device. Until now, such consideration has inhibited the application of biometric data security to networks accessed by wireless device.

SUMMARY OF THE INVENTION

The present invention relates to a method for protecting the security of a computer network which is accessed through the use of wireless devices, among other means. Specifically, the present invention pertains to a method of using user-specific biometric data to identify users of wireless devices such as PDAs and yet prevent use by unauthorized persons and prevent changing of the biometric data by unauthorized persons. The method also prevents unauthorized access, and facilitates authorized access, to computer networks. Control of access to the biometric data and control of access to the network can be maintained in the network administrator or other responsible body and thereby also offers security against theft.

In one embodiment, the method comprises the steps of reading biometric data, peculiar to the user, by the use of a biometric data reader coupled to the portable computing device, comparing the data with data stored in the computer network for the purpose of identifying the user denying further access if the user is not identified as an authorized user.

The method offers not only the means of securing networks against wireless access by unauthorized users but also preventing the use of the wireless portable computing device itself by unauthorized users.

If the wireless device is lost or stolen, or the authorized user terminates employment, the biometric data reader would remain with the wireless device but the biometric data would be inaccessible until authorized by the network manager, rendering the device inoperable until returned. If the wireless device is transferred to another authorized user, the network manager could reprogram the device remotely to the access the new user's data or could implement reprogramming by the new user.

BRIEF DESCRIPTION OF THE DRAWINGS

The operation of this invention can be best visualized by reference to the drawings.

DETAILED DESCRIPTION

In the following description of the present invention, numerous specific details are set forth in order to provide a thorough understanding of the present invention. However, it will be recognized by one skilled in the art that the present invention may be practiced without these specific details or with equivalents thereof. In other instances, well-known structures and devices are shown in block diagram form in order to avoid obscuring the present invention.

Described herein is a new method for controlling the access of wireless devices to a computer network. The preferred embodiment uses personal data assistants (PDAs) that are connected to a local area network (LAN). The preferred means of connection is by an RF interface, an Infrared connection, or some other means of allowing full, two way data communication between the network, or a workstation in it, and the PDA. Specifically, the preferred embodiment of the present invention pertains to a method of using user-specific biometric data to identify users of wireless devices and prevent use by unauthorized persons and unauthorized access to computer networks.

In the description of the embodiment herein, the terms "wireless device", "portable computing device", "palmtop computer", "handheld computer" and "personal data assistant" or PDA are used interchangeably. In every case the terms refer to any wireless device used to access a computer network.

Figure 1A:
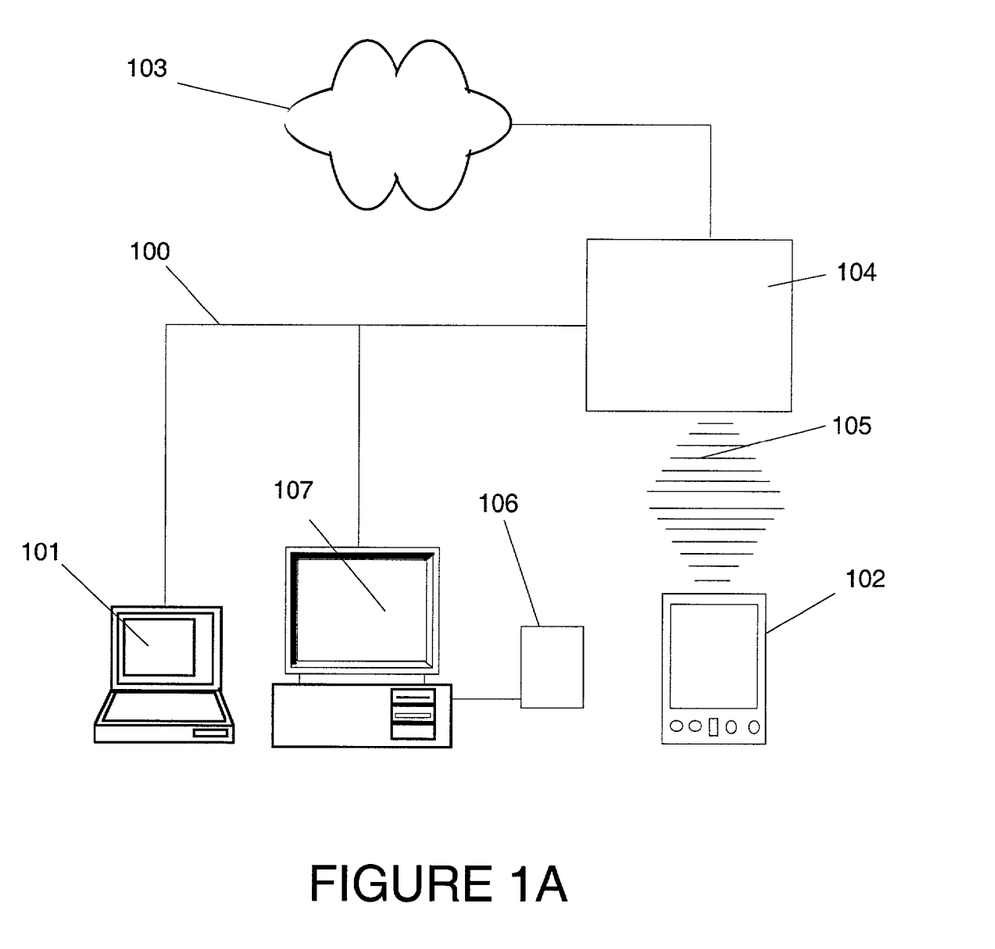
FIG. 1A illustrates a typical network environment in accordance with one embodiment of the present invention.
Figure 1B:
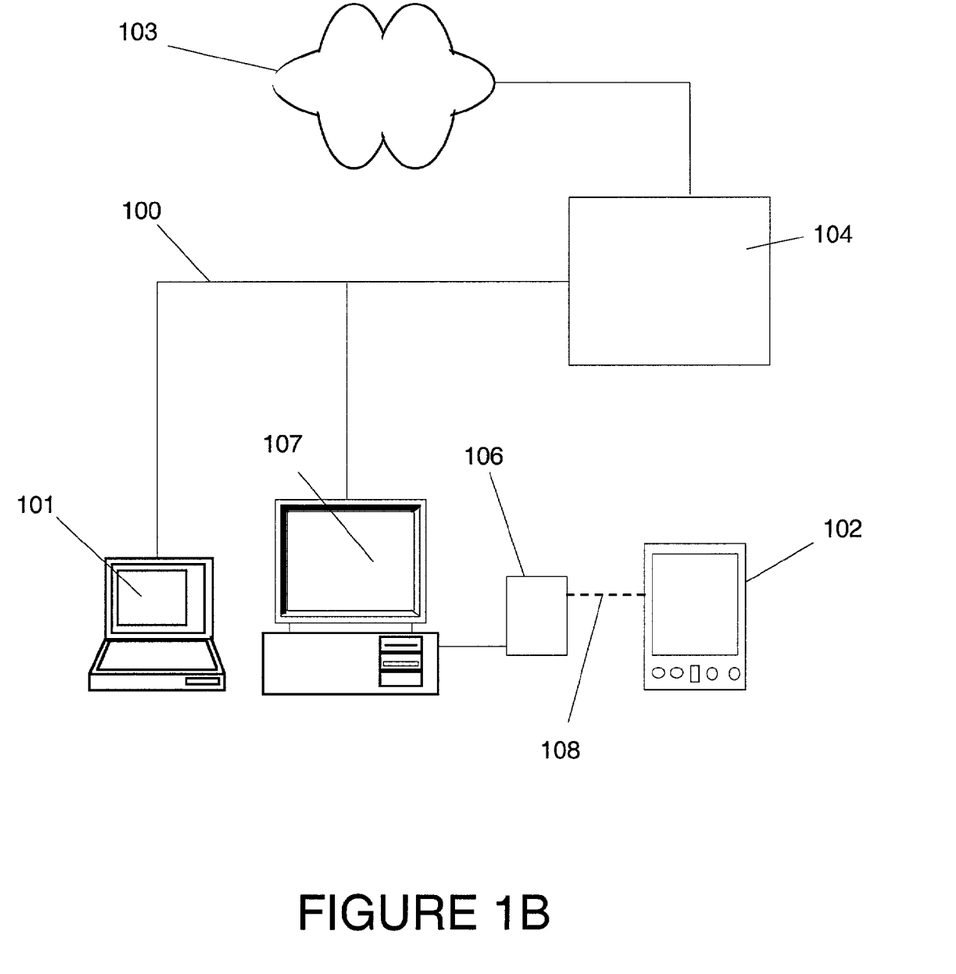
FIG. 1B illustrates a typical network environment as in FIG. 1A wherein a hard-wired connection of a portable computing device is implemented in accordance with one embodiment of the present invention.

More and more, local area networks (LAN)s, particularly in fast-paced "high-tech" industries, are accessed by wireless devices. FIG. 1A illustrates a typical computer network in which access is gained by wireless portable computing device, in this embodiment a PDA, as well as other means. Network connection 100 connects laptop computer 101 with server 104 and desktop computer 107. Server 104 is connected to internet 103 and, by wireless connection 105, to PDA 102. PDA cradle 106 is shown as an example of another means for the PDA to connect to the network. FIG. 1B illustrates the coupling, 108, of portable computing device 102 to the network via desktop computer 107 and attached wired cradle 106.

Figure 2:
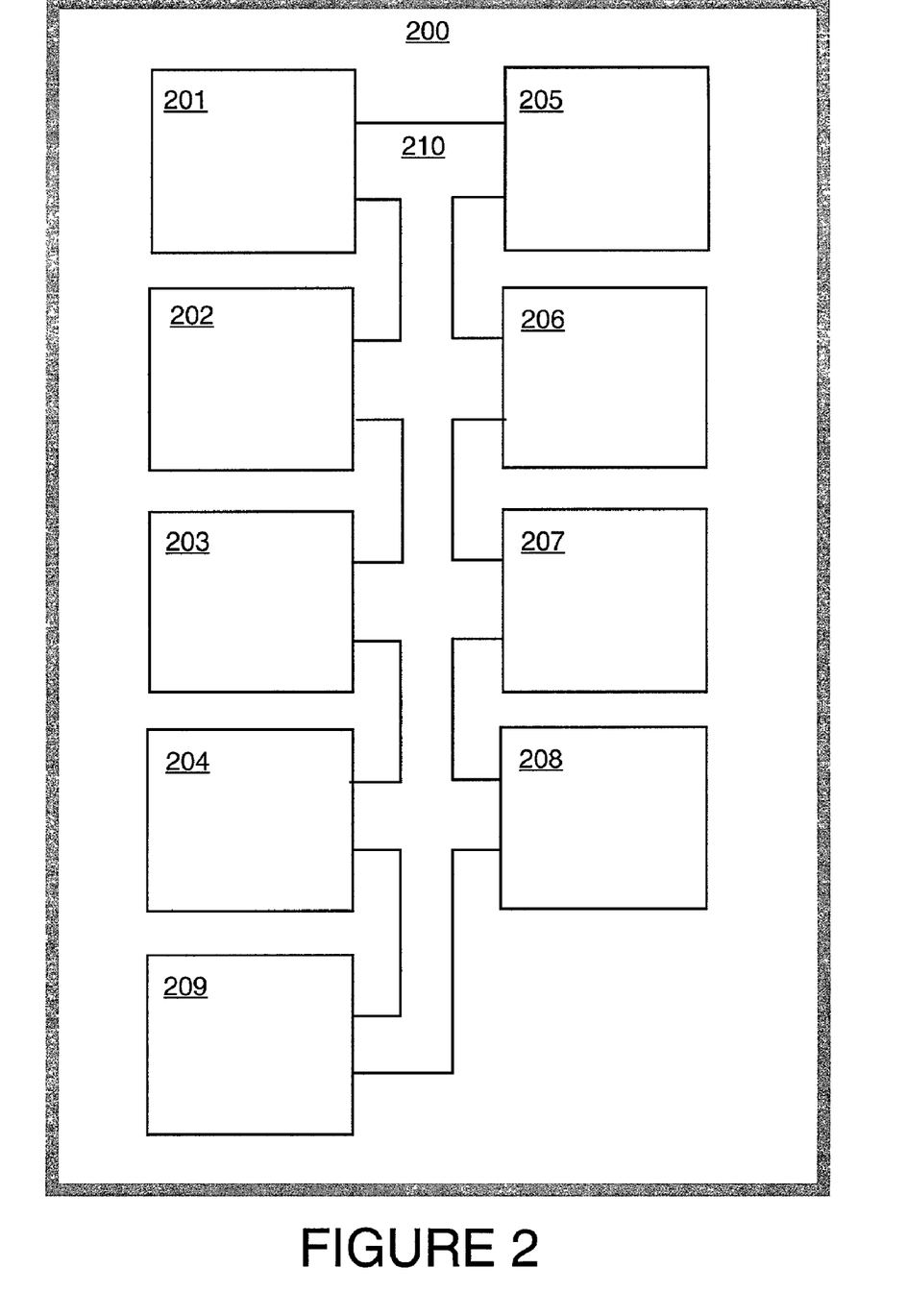
FIG. 2 is a block diagram illustrating an embodiment of a portable computer system in accordance with the present invention.

FIG. 2 illustrates, in block diagram, the configuration of a typical portable computing device or PDA consistent with this embodiment of the present invention. The block diagram is also consistent with a palmtop computer. Computer system 200 comprises bus 210 which connects processor 201, volatile RAM 202, non-volatile ROM 203 and data storage device 204. Also connected to the bus are display device 205, alpha-numeric input device 206, cursor control 207, and signal I/O device 208. In the embodiment of the present invention described here, bus 210 also connects to biometric data reading device 209. In a further embodiment of the present invention, biometric data reader 209 can be a physical component integral the PDA.

Figure 3:
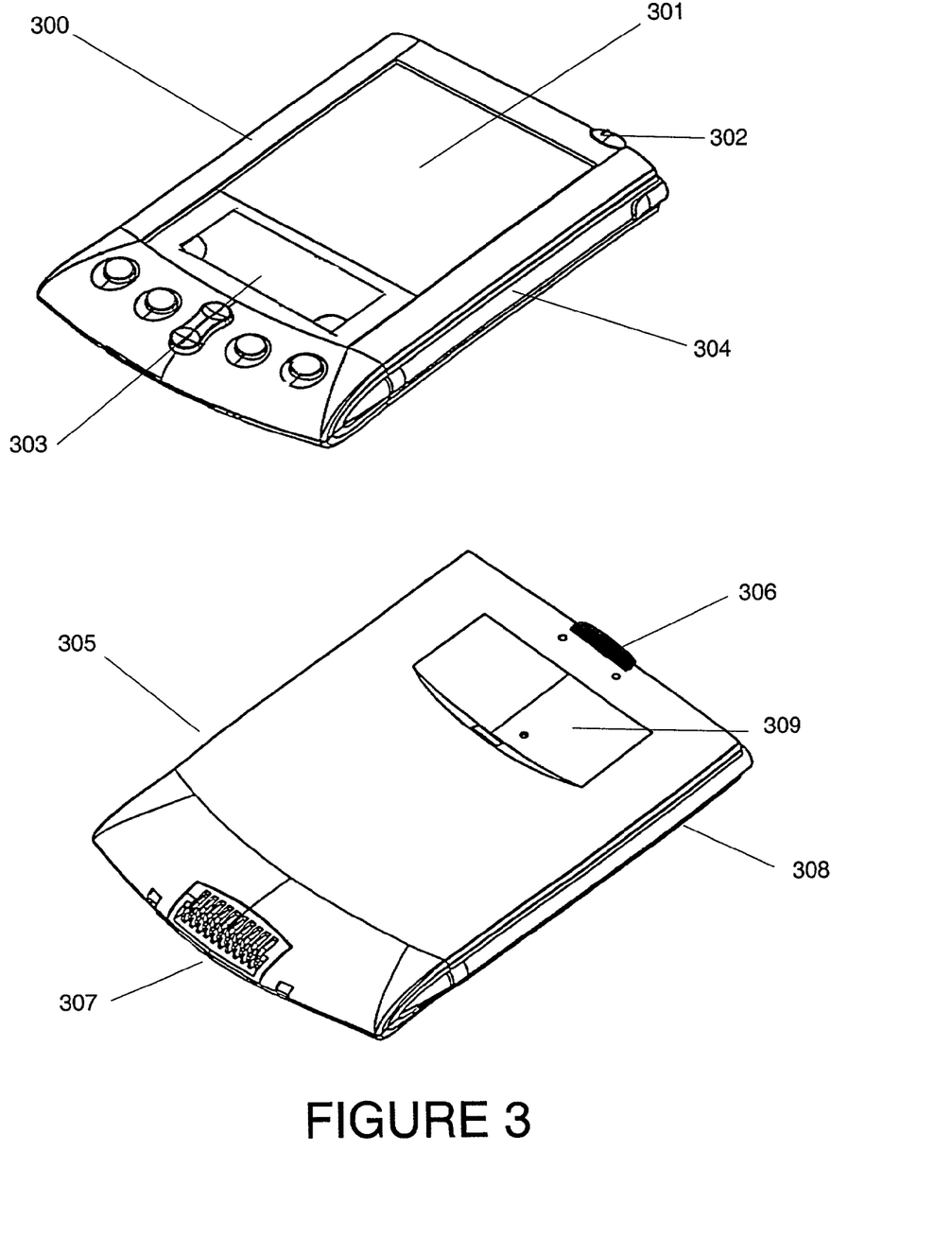
FIG. 3 illustrates a physical embodiment of a portable computer system in accordance with one embodiment of the present invention.

The category of portable computing devices can include "palmtop" computers and PDAs. A typical palmtop computer that can be used in various embodiments of the present invention is shown in FIG. 3, in top and bottom views. Panel 301, in top view 300, integrates display and, when touched with stylus 304, cursor control. Alpha-numeric input is via input panel 303. Power to the device is applied when on/off button 302 is depressed. Connection to a network can be implemented either through an RF connection using extendible antenna 308, or by infrared (IR) connection. IR connection is provided by IR window 306 which is shown on bottom view 305. Connector array 307 provides the capability for wired connectivity to a desktop computer and thence a network by the use of a cradle. Although implemented in this embodiment as a serial port, wired connectivity via connector 307 could also alternatively be any of a number of well known communication standards and protocols, e.g., parallel, SCSI (small computer system interface), Firewire (IEEE 1394), Ethernet, etc.

Figure 4:
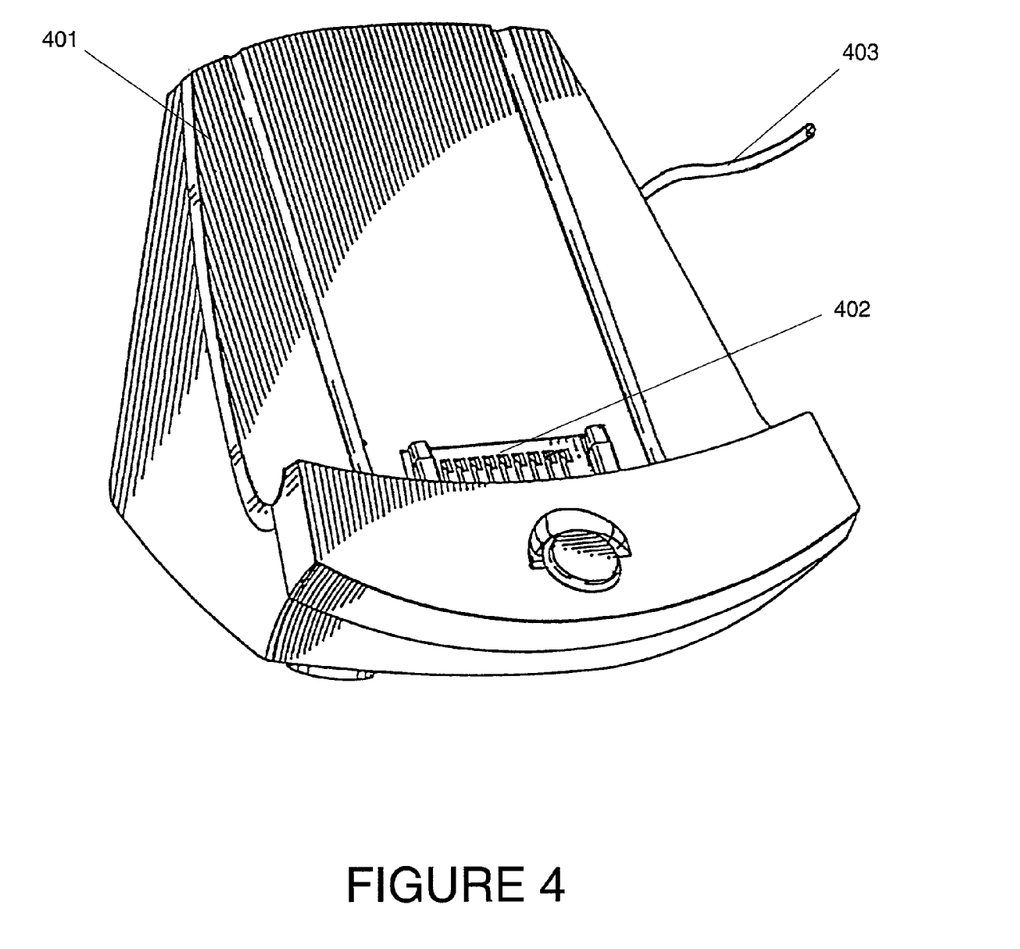
FIG. 4 illustrates a cradle for an alternative hard-wired connection of a typical portable computing device in accordance with one embodiment of the present invention.

A typical cradle is illustrated in FIG. 4. The PDA is set in base 401 which causes contact between the PDA's connector array 307 and the cradle connector array 402. Array 402 is, in this embodiment, the terminus of serial cable 403 which connects the desktop computer's serial bus.

Figure 5:
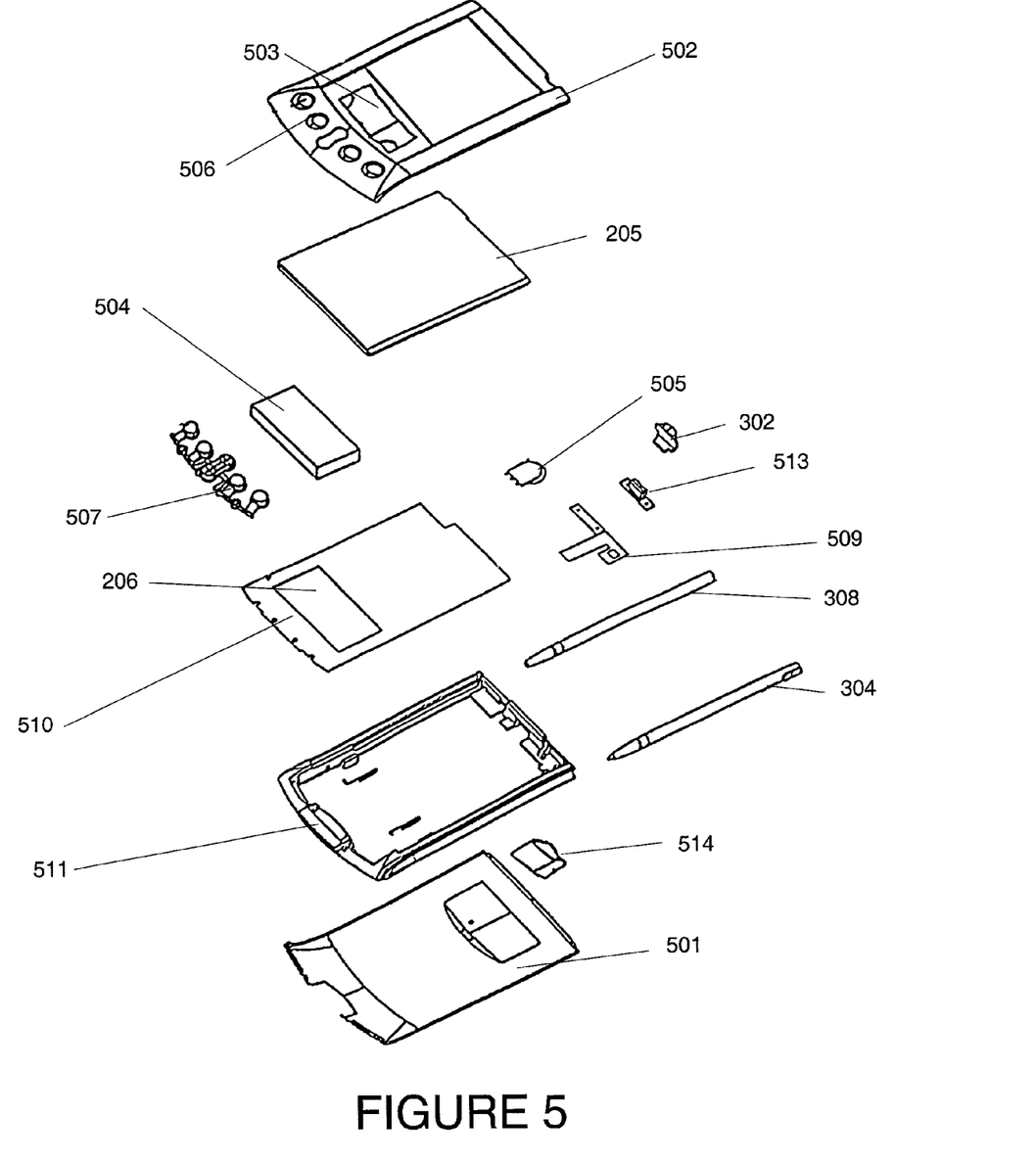
FIG. 5 illustrates an exploded view of a typical portable computing device in accordance with one embodiment of the present invention.

FIG. 5 is an exploded view of the palmtop computer system 200 in accordance with one implementation. Computer system 200 contains a back cover 501 and a front cover 502 having an outline of region 503 and holes 506 for receiving buttons 507. A flat panel display 205 (both liquid crystal display and touch screen) fits into front cover 502. Any of a number of display technologies can be used, e.g., liquid crystal display (LCD), field emission display (FED), plasma, etc., for the flat panel display 205. A battery 504 provides electrical power. A contrast adjustment 505, a potentiometer in this embodiment, is also shown, as well as an on/off button 302. A flex circuit 509 is shown along with a printed circuit (PC) board 510 containing electronics and logic (e.g., memory, communication bus, processor, etc.) for implementing computer system functionality. The digitizer pad 206, implementing one means of alpha-numeric input, is also included in PC board 510. A midframe 511 is shown along with stylus 304. Position-adjustable antenna 308 is also shown.

Infrared communication mechanism 513 (e.g., an infrared emitter and detector device) is for sending and receiving information from other similarly equipped devices or, in this embodiment, communicating with a network (see FIG. 1A). An embodiment implementing communication with a network through the infrared device does not preclude additional implementation of communication through other means such as an RF link.

To illustrate the implementation of an RF link in an embodiment of the present invention, a signal (e.g., radio) receiver/transmitter device 514 is also shown in FIG. 5. The receiver/transmitter device 514 is coupled to the antenna 308 and also coupled to communicate with the PC board 510. In one implementation the Mobitex wireless communication system is used to provide two-way communication between computer system 100 and other networked computers and/or the Internet via a proxy server (see FIG. 1A).

FIG. 5 illustrates the implementation of several features illustrated in FIG. 2. Some circuitry of computer system 200 can be implemented directly on PC board 510 (FIG. 5). PC board 510 can contain processor 201, bus 210, ROM 203 and RAM 202.

With reference still to FIGS. 2 and 5, computer system 200 also includes a signal transmitter/receiver device 514, which is coupled to bus 210 for providing a physical communication link between computer system 200, and a network environment (e.g., network environment 100 of FIG. 1A). As such, signal transmitter/receiver device 514 enables central processor unit 201 to communicate wirelessly with other electronic systems coupled to the network. It should be appreciated that within the present embodiment, signal transmitter/receiver device 514 is coupled to antenna 308 (FIGS. 3 and 5) and provides the functionality to transmit and receive information over a wireless communication interface. It should be further appreciated that the present embodiment of signal transmitter/receiver device 514 is well suited to be implemented in a wide variety of ways. For example, signal transmitter/receiver device 514 could also be implemented as a modem.

Figure 6:
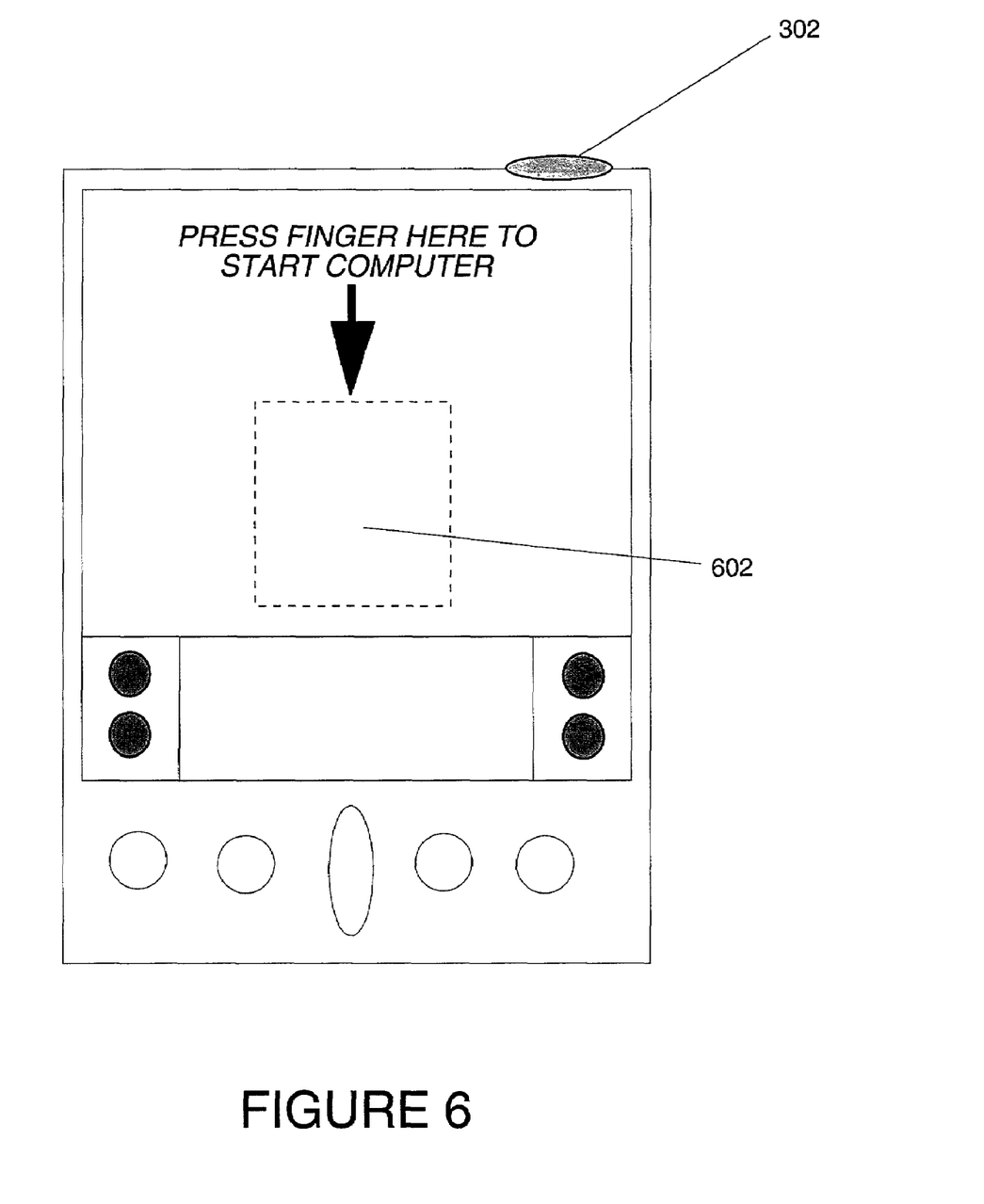
FIG. 6 illustrates one possible implementation of a display in accordance with one embodiment of the present invention.

In one embodiment of the present invention, a biometric data reader (209 in FIG. 2) is integrated as part of touch screen display panel 205. A possible power-up display associated with such an embodiment is shown in FIG. 6 wherein a fingerprint reader is implemented in print reader screen portion 602. In this embodiment, this display would appear when the device was turned on with power switch 302. Then, to continue further powerup, the user's biometric identity, here by fingerprint, would have to be established.

Biometric data is data specific to the person of an individual user. Examples of user-specific biometric data are computerized fingerprints, iris scans, speech pattern scans, or various electrical characteristics such as body impedance. Fingerprints have a long history as identification devices and the technology to read them electronically is now well established. Therefore, one embodiment of the present invention would use a finger- or thumbprint scanning device and digitized fingerprint data. In this embodiment, the user's digitized thumbprint is read and stored in some location in the computer network.

In order to use the wireless device as implemented in this embodiment, the user must be identified as an authorized user. In order to be so identified, the user touches a thumb, the preferred digit in this embodiment, to the reading surface of the PDA. Though a thumb is used in this embodiment, other digits could easily be used to the same end in other embodiments. The reading surface can be implemented as part of touchscreen 205 or as some other part of the PDA, or even as a peripheral device to the PDA.

The biometric reading device, here a thumbprint or fingerprint scanner, scans the user's thumbprint, producing computerized data that is then compared with stored data from a previous scan. The software to accomplish this comparison is well established in the prior art. If the comparison meets the criteria established for proper identification, then the user is allowed to continue access to the network. If the comparison does not meet the criteria, network access is denied unless authorized by the network manager. An iris scanner, speech pattern reader, electrical characteristics reader or any other biometric data reader could function similarly to the thumbprint scanner described.

In order to properly identify the user in this embodiment, the biometric data that is compared to is data from previously read or scanned data, taken from the desired identified user. A thumbprint, for example, can be stored as digitized information and the technology to do so is well established in the prior art as is the comparison software. To implement this embodiment, the comparison and identification would be a part of the network access procedure.

In a further embodiment, the computerized biometric data can be installed on the portable device itself. Digitized information can be stored as a file on a hand-held device such as a PDA as well as in a network. Furthermore, the digitized data can be installed on the PDA via the wireless link by which the PDA has access to the computer network. This further embodiment allows the additional security feature of preventing access to operation of the PDA itself. This can provide security for sensitive data resident in the PDA's data storage device (204 FIG. 2).

In order to implement this feature, the biometric data identification can become part of the power-up procedure. In yet a further embodiment, the "On" button of the portable computing device could be incorporated into the same physical device as the thumbprint scanner.

In the further embodiment wherein the biometric data is stored within the portable computing device, should the wireless device be lost or stolen or the authorized user terminate employment, the biometric data reader would remain with the wireless device. However, the biometric data would be removed remotely by the network manager, rendering the device inoperable until returned. While power would have to be available in this embodiment to the level necessary for the identification process to take place or to receive power-up authorization from the network administrator, full power-up and subsequent access to the wireless device's on-board data and to the network would be restricted until passage of the identity check. If the user were to be properly identified by the check, then full operation would ensue. If the user were not properly identified, then the wireless device would power down and only the authorized user would be able to restore it to operation unless the network administrator reprogrammed the device's stored fingerprint. Since the device would not power up without an authorized user's identification, an unidentified user would not be able to reprogram the stored fingerprint without the network administrator's permission.

In yet another embodiment of the present invention, the wireless device would incorporate an iris scanner that had a means for scanning the image of the potential user's eye. Though not as well accepted generally as fingerprints, iris scans are a proven identification device with a well established technology for computerization and storage.

An added benefit of a biometric data identification check would be the deterrence of theft. The convenience and small size of PDAs makes them a popular theft target. If a PDA equipped with a biometric scanner were stolen, the device would be inoperable by the thief or by a subsequent possessor, rendering it undesirable to potential thieves.

In a further embodiment of the present invention, a wireless device, itself, could be the means of acquiring the biometric identity data for an authorized user. An initialization routine, activated on first start up or on subsequent reprogramming, would acquire the fingerprint, iris scan, voice pattern scan, or other biometric. The data thus acquired would then be stored in both the device and a site under the network administrator's direct control. Then that data would be available to reprogram a new device should the first one be lost, damaged or stolen.

If the wireless device is transferred to another authorized user, the network manager could reprogram the device remotely to the new user's data or could implement reprogramming by the new user individually.

Figure 7:
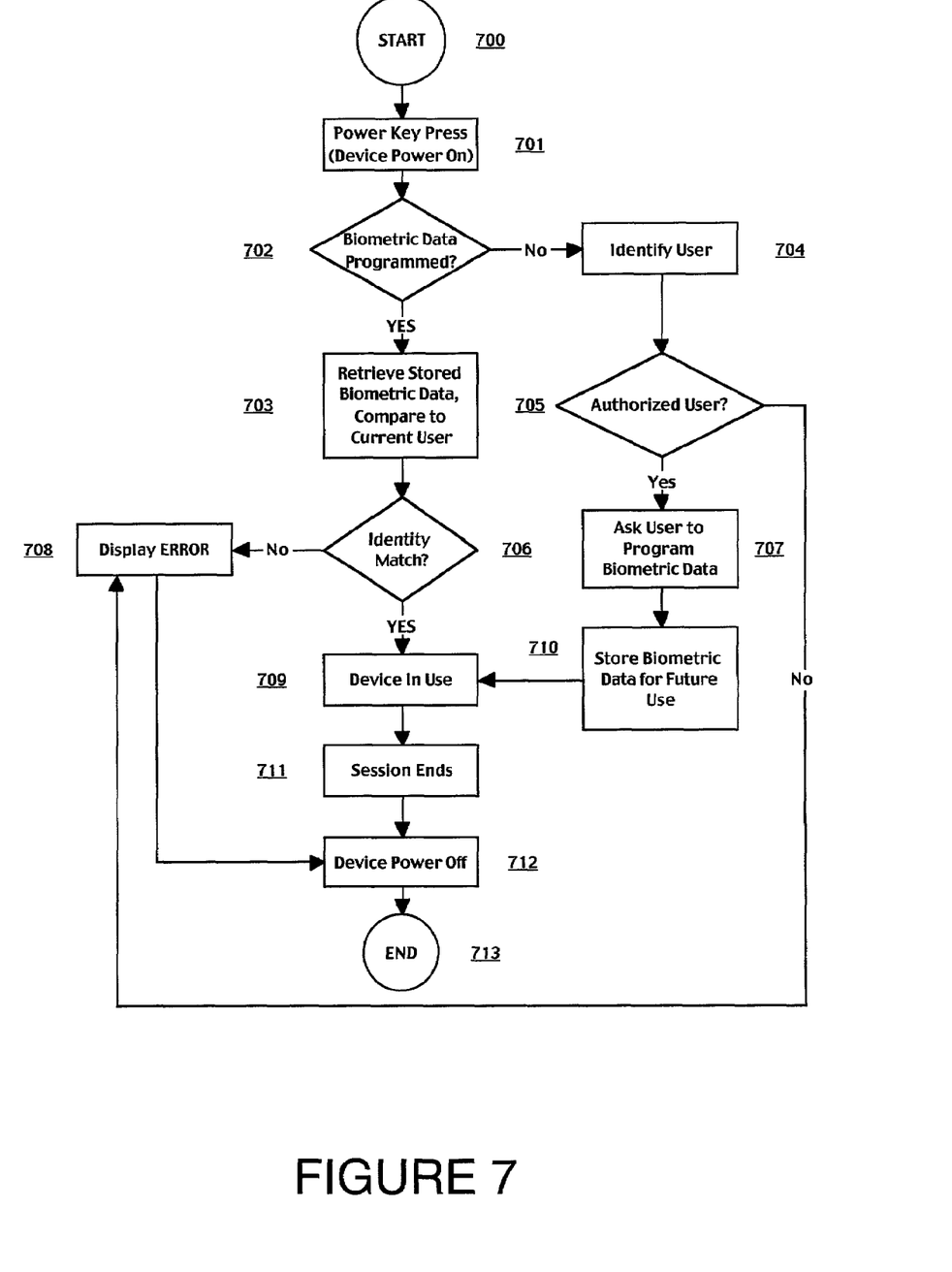
FIG. 7 is a flow chart illustrating a possible process of operation of one embodiment of the present invention.

The process by which the identification and authorization or denial of access takes place in one embodiment may best be envisioned by reference to the flow chart in FIG. 7. At start 700, a power key on the wireless device is depressed, 701. The existence of biometric data is assessed, 702. If the biometric data is not programmed, the network administrator identifies the user, 704, and determines if the user is an authorized user, 705. If authorized, the user programs or initializes the appropriate biometric data, 707, and it is stored for future use, 710.

If, when started, the device is preprogrammed with biometric data at 702, the potential user's new biometric scan is compared with the stored data, 703, and the user is either identified or not, 706. If the user is not identified as an authorized user an error is displayed, 708, and the device powers down, 712, ending the user's access, 713. If the user is identified as an authorized user then the device operates normally, 709, providing network access and other features until the session ends, 711, and the user powers down, 712.

With this or other embodiments of the present invention, a way to achieve a high level of security for networks accessed by wireless devices has been described. Furthermore, an additional level of security has been described for wireless devices themselves.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for controlling access to a computer network, comprising:
   gaining access to said computer network by use of a portable computing device;
   reading biometric data peculiar to a user by the use of a biometric data reader coupled to said portable computing device;
   if no previously stored biometric data is stored in said portable computing device, determining if said user of said portable computing device is authorized for network use;
   acquiring new biometric data if said user is authorized for network use;
   storing said new biometric data;
   comparing said biometric data peculiar to said user to previously stored biometric data stored in said portable computing device and said computer network for the purpose of identifying said user, and wherein said previously stored biometric data is operable to be removed from said portable computing device on instruction by a remote station on said computer network, said remote station retaining a copy of said biometric data; and
   denying further access to said computer network and said portable computing device if said comparing step fails to identify said user as an authorized user.

2. A method as in claim 1 wherein said access to said computer network is by use of a wireless connection.

3. A method as in claim 1 wherein said biometric data is a fingerprint.

4. A method as in claim 1 wherein said biometric data is an iris scan.

5. A method as in claim 1 wherein said biometric data comprises one or more measured electrical characteristics.

6. A method as in claim 1 wherein said biometric data can be programmed into said portable computing device by a remote station on said computer network.

7. A method for controlling access to a portable computing device, comprising:
   reading biometric data peculiar to a user;
   if no previously stored biometric data is stored in said portable computing device, determining said user of said portable computing device is authorized for network use;
   acquiring new biometric data if said user is authorized for network use;
   storing said new biometric data;
   comparing said biometric data with previously stored biometric data for the purpose of identifying said user, and wherein said previously stored biometric data is operable to be removed from said portable computing device on instruction by a remote station on a computer network, said remote station retaining a copy of said previously stored biometric data; and
   preventing access to said computer network and said portable computing device if said user is not identified as an authorized user and powering down said portable computing device.

8. A method as in claim 7 wherein said biometric data is a fingerprint.

9. A method as in claim 7 wherein said biometric data is an iris scan.

10. A method as in claim 7 wherein said biometric data comprises one or more measured electrical characteristics.

11. A method as in claim 7 wherein said previously stored biometric data stored in said portable computing device can be controlled by a remote station on said computer network.

12. An apparatus for controlling access to a computer network, comprising:
    a computer network, said computer network comprising one or more computer workstations, wherein access to said computer network is provided by said one or more workstations upon authentication of biometric data from a user;
    a portable computing device, said portable computing device providing wireless access to said computer network and wherein said portable computing device is powered down upon unsuccessful authentication of biometric data from said user;
    a biometric data reading device coupled to said portable computing device;
    a data storage device for storing biometric data capable of identifying one and only one user; and
    a wireless communication device coupled to said computer network, capable of enabling the loading and removing of said biometric data stored in said portable computing device, and wherein said biometric data is operable to be removed from said portable computing device on instruction by one of said one or more workstations on said computer network, said one of said one or more workstations retaining a copy of said biometric data, and if no previously stored biometric data is stored in said portable computing device, determining if said user of said portable computing device is authorized for network use, acquiring new biometric data if said user is authorized for network use, and storing said new biometric data.

13. An apparatus as in claim 12 wherein said portable computing device comprises:
    a bus;
    a memory unit coupled to said bus;
    a data storage device coupled to said bus, capable of storing said biometric data;
    a biometric data reader coupled to said bus;
    a communication device coupled to said bus for communicating with said computer network; and
    a processor coupled to said bus, said processor for performing a method for identifying said user by use of said biometric data, said method comprising the steps of:
    reading applicable biometric data; and comparing said biometric data with said biometric data stored in said memory unit.

14. An apparatus as in claim 13 wherein said portable computing device is a personal data assistant (PDA).

15. An apparatus as in claim 13 wherein said biometric data reading device is implemented as part of the portable computing device.

16. An apparatus as in claim 12 wherein said biometric data is a fingerprint.

17. An apparatus as in claim 12 wherein said biometric data is an iris scan.

18. An apparatus as in claim 12 wherein said biometric data is any electronically storable identifying biometric data.

19. An apparatus as in claim 12 wherein said biometric data comprises one or more measured electrical characteristics.

20. An apparatus as in claim 12 wherein said computer network further comprises a remote station connected to said computer network.

21. An apparatus as in claim 20 wherein said remote station is for performing a method of network access control, said method comprising:

uploading said biometric data from said portable computing device;

downloading said biometric data to said portable computing device;

and erasing said biometric data from said portable computing device.

* * * * *